(12) United States Patent
Ruff

(10) Patent No.: US 9,013,084 B2
(45) Date of Patent: Apr. 21, 2015

(54) INDUCTION GENERATOR

(75) Inventor: Eduard Ruff, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 136 days.

(21) Appl. No.: 13/636,307

(22) PCT Filed: Feb. 14, 2011

(86) PCT No.: PCT/EP2011/052092
§ 371 (c)(1),
(2), (4) Date: Dec. 5, 2012

(87) PCT Pub. No.: WO2011/117022
PCT Pub. Date: Sep. 29, 2011

(65) Prior Publication Data
US 2013/0093540 A1 Apr. 18, 2013

(30) Foreign Application Priority Data
Mar. 23, 2010 (DE) .......................... 10 2010 003 151

(51) Int. Cl.
*H02K 17/42* (2006.01)
*H02K 19/20* (2006.01)
(Continued)

(52) U.S. Cl.
CPC ................. *H01H 51/22* (2013.01); *E04B 1/21* (2013.01); *H02K 35/02* (2013.01)

(58) Field of Classification Search
CPC ...................................................... H02K 35/02
USPC ..................... 310/12.12, 15, 29, 36, 168, 171
See application file for complete search history.

(56) References Cited

U.S. PATENT DOCUMENTS 2,832,902 A * 4/1958 Drescher .......................... 310/15
2,904,707 A * 9/1959 Drescher .......................... 310/15
(Continued)

FOREIGN PATENT DOCUMENTS

DE 198 52 470 A1 5/2000
DE 101 25 059 A1 12/2002
(Continued)

OTHER PUBLICATIONS

International Search Report and Written Opinion issued in international application No. PCT/EP2011/052092, mailed Jul. 13, 2012 (17 pages including translation of the ISR).

*Primary Examiner* — Mohamad Musleh
(74) *Attorney, Agent, or Firm* — Brinks Gilson & Lione

(57) ABSTRACT

An induction generator for a radio switch having a magnet element as well as an induction coil with a coil core wherein the coil core is U-shaped, wherein a first rest position and a second rest position are in each case defined for the magnet element, in contact with the limbs of the coil core, and a flux direction reversal takes place in the coil core, whenever a change takes place between these positions, wherein a movement path for the magnet element is predetermined for a movement between the rest positions, wherein the induction generator has a first mechanical energy storage device which is operatively connected to the magnet element and first of all stores energy in the course of forcing a movement from a rest position and, after reaching an intermediate position, which is defined along the movement path and corresponding to which the magnetic forces on the coil core suddenly decrease, emits this energy to the magnet element in order to mechanically accelerate the movement of the magnet element to the respective other rest position after leaving the intermediate position.

19 Claims, 13 Drawing Sheets

(51) Int. Cl.
*H02K 19/24* (2006.01)
*H01H 51/22* (2006.01)
*E04B 1/21* (2006.01)
*H02K 35/02* (2006.01)

(56) References Cited

U.S. PATENT DOCUMENTS

| | | | |
|---|---|---|---|
| 3,693,033 A | 9/1972 | Troesh | |
| 4,412,355 A * | 10/1983 | Terbrack et al. | 398/111 |
| 4,471,353 A * | 9/1984 | Cernik | 340/12.22 |
| 4,500,827 A * | 2/1985 | Merritt et al. | 322/3 |
| 7,498,681 B1 * | 3/2009 | Kellogg et al. | 290/1 R |
| 7,786,887 B2 | 8/2010 | Schmidt | |
| 8,228,151 B2 | 7/2012 | Schmidt | |
| 2005/0035600 A1 | 2/2005 | Albsmeier et al. | |
| 2006/0091984 A1 * | 5/2006 | Schmidt | 335/78 |
| 2009/0095609 A1 * | 4/2009 | Ruff | 200/329 |

FOREIGN PATENT DOCUMENTS

| | | |
|---|---|---|
| DE | 103 15 764 A1 | 10/2004 |
| DE | 103 15 765 B4 | 12/2006 |
| EP | 2 079 154 A1 | 7/2009 |
| FR | 2 753 584 A1 | 3/1998 |
| GB | 879938 A | 10/1961 |

* cited by examiner

INDUCTION GENERATOR

This application is a filing under 35 U.S.C. §371 of International Patent Application PCT/EP2011/052092, filed Feb. 14, 2011, which claims priority to German Application No. 10 2010 003 151.8, filed Mar. 23, 2010, each of which is incorporated by reference herein in its entirety.

The present invention relates to an induction generator for a radio switch according to the preamble of claim 1, in particular for a miniature snap-action switch.

In the prior art, numerous induction generators have been proposed, which, as in this case, are designed for use in a self-powered radio-switch applications.

For example, the document DE 101 25 059 A1 shows an inductive voltage generator, which has a mechanical energy storage device. The energy storage device stores operation energy until a transition point is reached, when a permanent magnet of the induction system suddenly moves. Due to the movement, the magnetic flux suddenly changes, wherein said permanent magnet hits the core at the beginning or end of the movement.

Document U.S. Pat. No. 3,693,033 shows a pulse generator designed as a push button, in which by the movement of the push button a core of a first permanent magnet dips into a coil. The magnetic field of a further permanent magnet holds the first permanent magnet, until the actuation energy introduced into the push button allows a quick loosening and dipping into the coil, which has the result of a short voltage signal.

DE 103 15 765 B4 shows an electromagnetic energy converter, in which an element enclosed by a coil can be moved relative to a permanent magnet, wherein in a first and a second rest positions in each case the magnetic flux is closed by the movable element. The energy converter is designed such that also as a result of a slow actuation enough energy for operating a radio switch is converted. For this purpose, the movable element can flip over by actuation between a first and a second position respectively after overcoming the magnetic forces.

DE 198 52 470 A1 shows a power generation system, in which permanent magnets are moved past each other in a resonant circuit in an induction coil arrangement.

In order to make such a radio switch in a miniaturized form, despite a small size of the induction system there must be regularly generated high electrical energy from the mechanical actuation process of the switch. In this regard, the known solutions can be improved.

Based on this, the technical task of the present invention is to propose an alternative, miniaturizable induction generator for a radio switch, which with a small size of the induction system generates a high induction voltage when actuated.

This technical task is resolved by the features of claim 1.

The invention proposes an induction generator for a radio switch with a magnet element and an induction coil having a coil core, wherein the coil core is formed U-shaped, wherein a first and a second rest position respectively in contact with the limbs of the coil core is defined for the magnet element, during the switching between the two of them a flux direction reversal occurs in the coil core, wherein a movement path for the magnet element for a movement between the rest positions is predetermined, said induction generator comprising a first mechanical energy storage device, which is operatively connected to the magnet element, which in the course of forcing a movement from a rest position first saves energy and, after reaching an intermediate position, which is defined along the movement path, and corresponding to which the magnetic forces on the coil core suddenly decrease, emits this energy to the magnet element in order to mechanically accelerate the movement of the magnet element to the respective other rest position.

In an inventive embodiment of the induction generator, the magnet element for reversing the polarity of the coil core is arranged on the induction generator, in particular the induction coil, in which the limbs are adjacent to each other so that it can be displaced in a direction relative to the limbs.

In a further embodiment of the invention of the induction generator, the movement path between the rest positions is predetermined such that the magnet element, in a forced movement after leaving the intermediate position up to the moment of taking up the other rest position, in each case reaches direct contact with the coil core.

In yet another embodiment of the invention of the induction generator, the movement path is predetermined such that when leaving a rest position, a displacement and subsequently a turn-in occurs during the movement from the first rest position to the second rest position and vice versa.

According to one aspect of the inventive induction generator, the movement path for the magnet element is predetermined by means of a cam control, which is formed by means of a control profile and an engaging element guided along the control profile. In this arrangement, the control profile in particular defines the first and the second rest positions at the ends of the movement path, wherein a movement path is predetermined between the first and the second rest positions, which predetermines a displacement of the magnet element from one rest position and a subsequent turning into the respective other rest position.

According to another aspect of the inventive induction generator, in order to predetermine the movement path that allows a displacement and a subsequent turn-in, the control profile of the cam control comprises two bevels corresponding to each other, between which an extreme value or a plateau is formed such that a displacement and a turn-in of an engaging element guided thereon from one rest position into the other rest position is made possible.

According to yet another aspect of the invented induction generator, the engaging element is pressed against the control profile by means of a biasing force.

In an inventive embodiment of the induction generator, during a forced movement the magnet element is guided along the movement path by means of an engaging element that is guided along a control profile, wherein the control profile is taken in by a control cam carrier formed as a control cage, wherein the control profile is formed in particular as a profile groove.

In a further embodiment of the invention of the induction generator, the magnet element comprises the engaging element, wherein the induction coil comprises a control cam carrier, which forms the control profile of the cam control, wherein the engaging element is guided in a forced movement along the control profile between the rest positions.

In yet another embodiment of the invention of the induction generator, in order to define the first and the second rest positions, the control profile comprises in each case a stop element, which in particular together with a bevel of the control profile forms a locking seat for the engaging element.

According to the invention, an induction generator is proposed, wherein the induction generator comprises a second mechanical energy storage device, which increasingly stores actuation energy in correspondence with the movement of the magnet element from the first initial rest position to the second rest position actuation energy, which is then releasable to force a movement of the magnet element in the reverse direction.

According to one aspect of the inventive induction generator, the induction generator comprises a spring element for actuation, in particular a spring element designed as an actuator that forms the first energy storage device for storage of actuation energy in the course of forcing a movement, in particular an L-shaped or stirrup-shaped actuator.

According to another aspect of the inventive induction generator, the spring element forms the first mechanical energy storage device, which is designed for storing actuating energy that is releasable for a mechanical acceleration of the movement of the magnet element from one rest position to the other rest position, and the second mechanical energy storage device, which is designed for storing actuating energy to generate a restoring force, wherein the second mechanical energy storage device is formed in particular in an integrating manner with the first mechanical energy storage device.

According to yet another aspect of the inventive induction generator, the first mechanical energy storage device is formed in the form of a first section of the spring element, which is connected to the magnet element by means of a connecting element in such a stiff fashion that a torque and a force can be transferred, in particular by means of an arm, wherein a biasing force is acting on the magnet element by means of the connecting element, in particular a biasing force generated by the first mechanical energy storage device.

In an inventive embodiment of the induction generator, the first mechanical energy storage device is formed as a first section of the spring element, to which is articulated a connecting element that is connected, in particular joint-connected, to the magnet element such that a force is transferable to the magnet element.

In a further embodiment of the invention of the induction generator, the first energy storage device, which is formed in particular as at least one spring arm, extends from a force-introduction area of the spring element in the direction of said magnet element, wherein the second energy storage device, which is formed in particular as a leaf-shaped spring element, extends from the force-introduction area of the spring element in the direction to the longitudinal end of the magnet element facing away from the induction coil.

In yet another embodiment of the induction generator, the spring element is supported by the second energy storage devices in the induction coil, as well as connected by means of the first energy storage devices to the magnet element for force transmission.

Furthermore, the invention proposes an induction generator, wherein using the stored energy of the first mechanical energy storage device for the mechanical acceleration of the movement of the magnet element, a force can be exerted on the magnet element, in particular by means of the first section of the spring element, which acts in a direction in which the limbs are adjacent to each other.

In an inventive embodiment of the induction generator, the control profile defines a position for the magnet element between the first and the second rest positions, which is formed as a meta-stable position.

According to the invention, there is also proposed a radio switch with a transmitter module and an antenna, wherein the radio switch has an inventive induction generator.

Further features and advantages of the invention will become apparent from the following description of the exemplary embodiments according of the invention with reference to the figures of the drawings, which show the details essential to the invention, and from the claims. The individual features can be realized each individually or in any combination of more of them in a variant of the invention.

Preferred embodiments of the invention are explained in more detail using the accompanying drawings. In the drawings.

Figure 1:
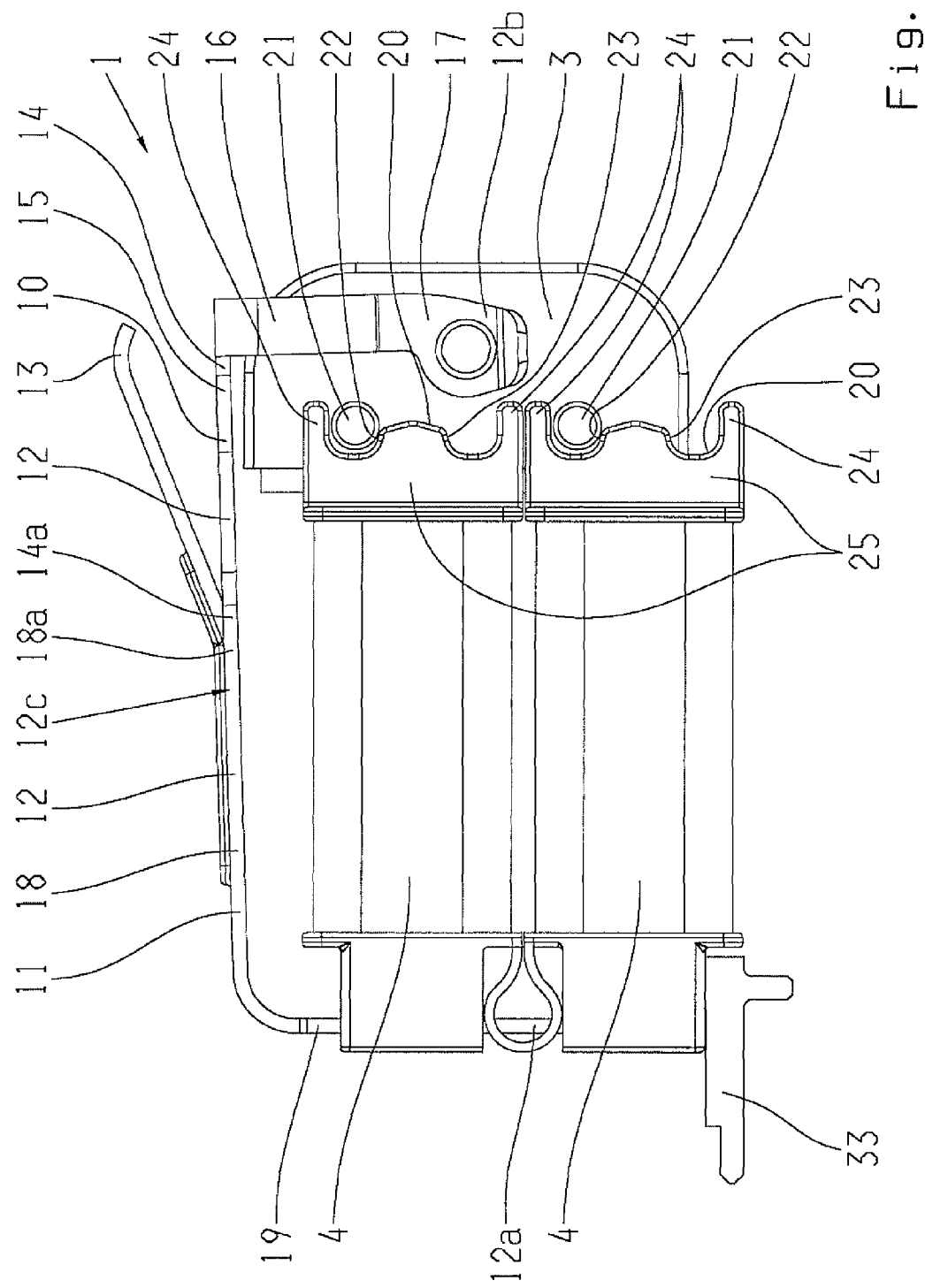
FIG. 1 shows an example of a side view of a first embodiment of the induction generator according to an embodiment of the invention.
Figure 2:
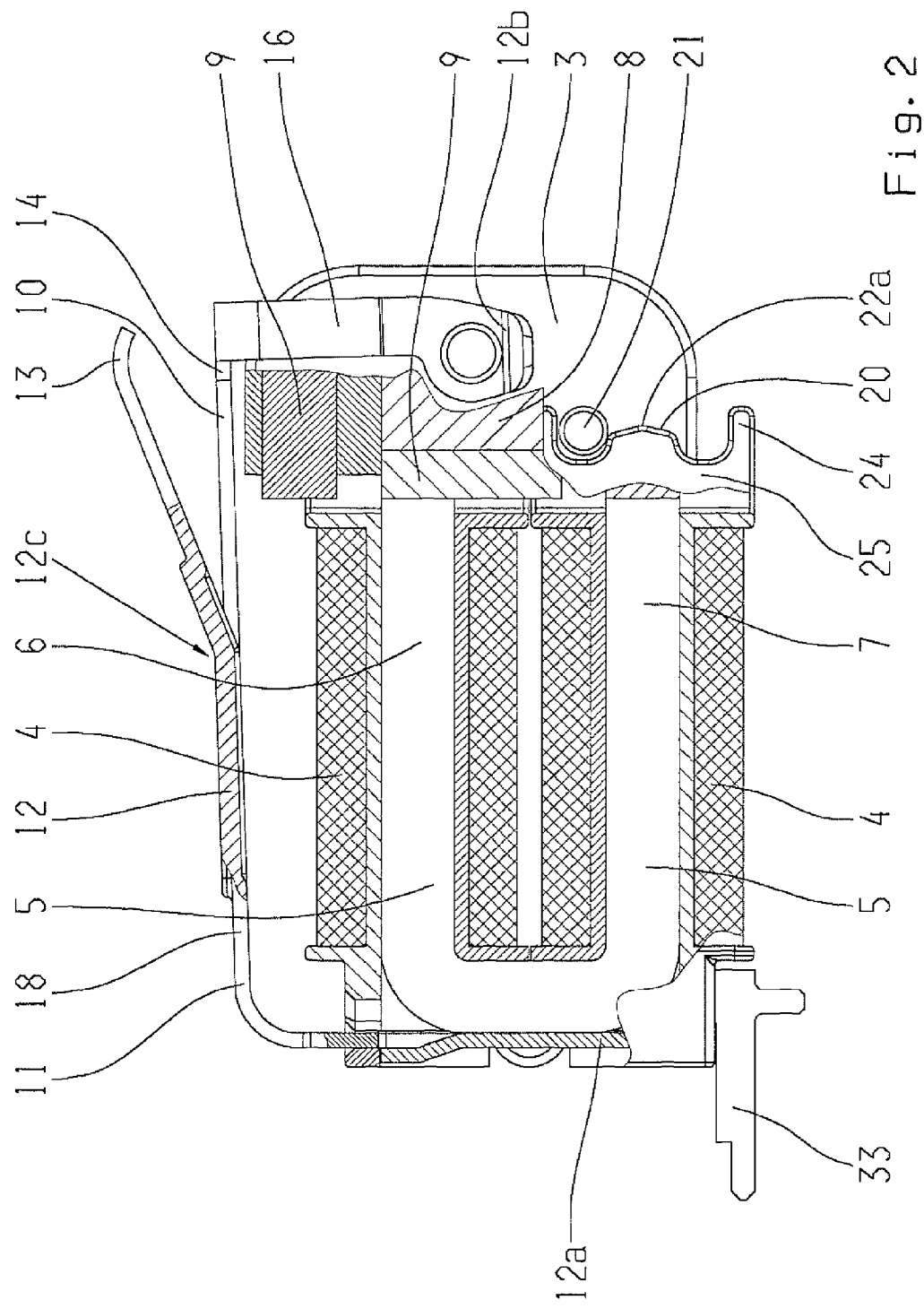
FIG. 2 shows a view of an exemplary partially cut induction generator of FIG. 1.
Figure 5A:
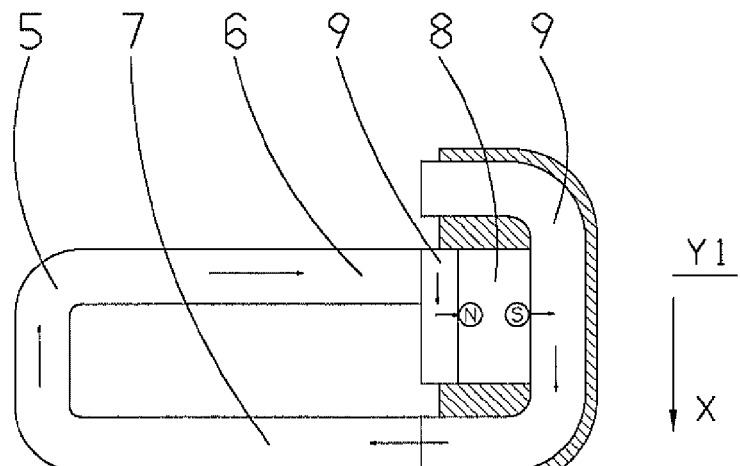
Figure 6:
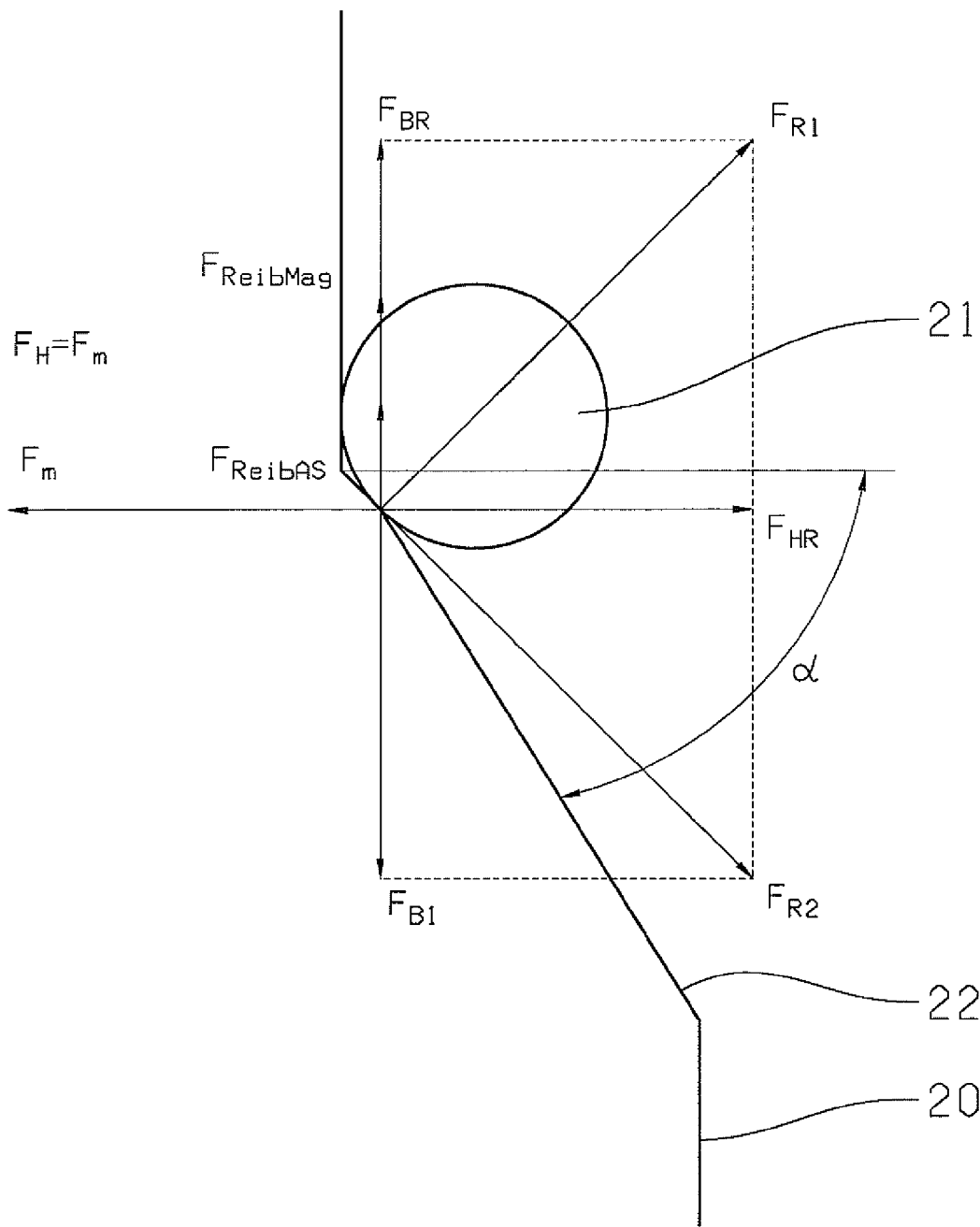
Figure 7:
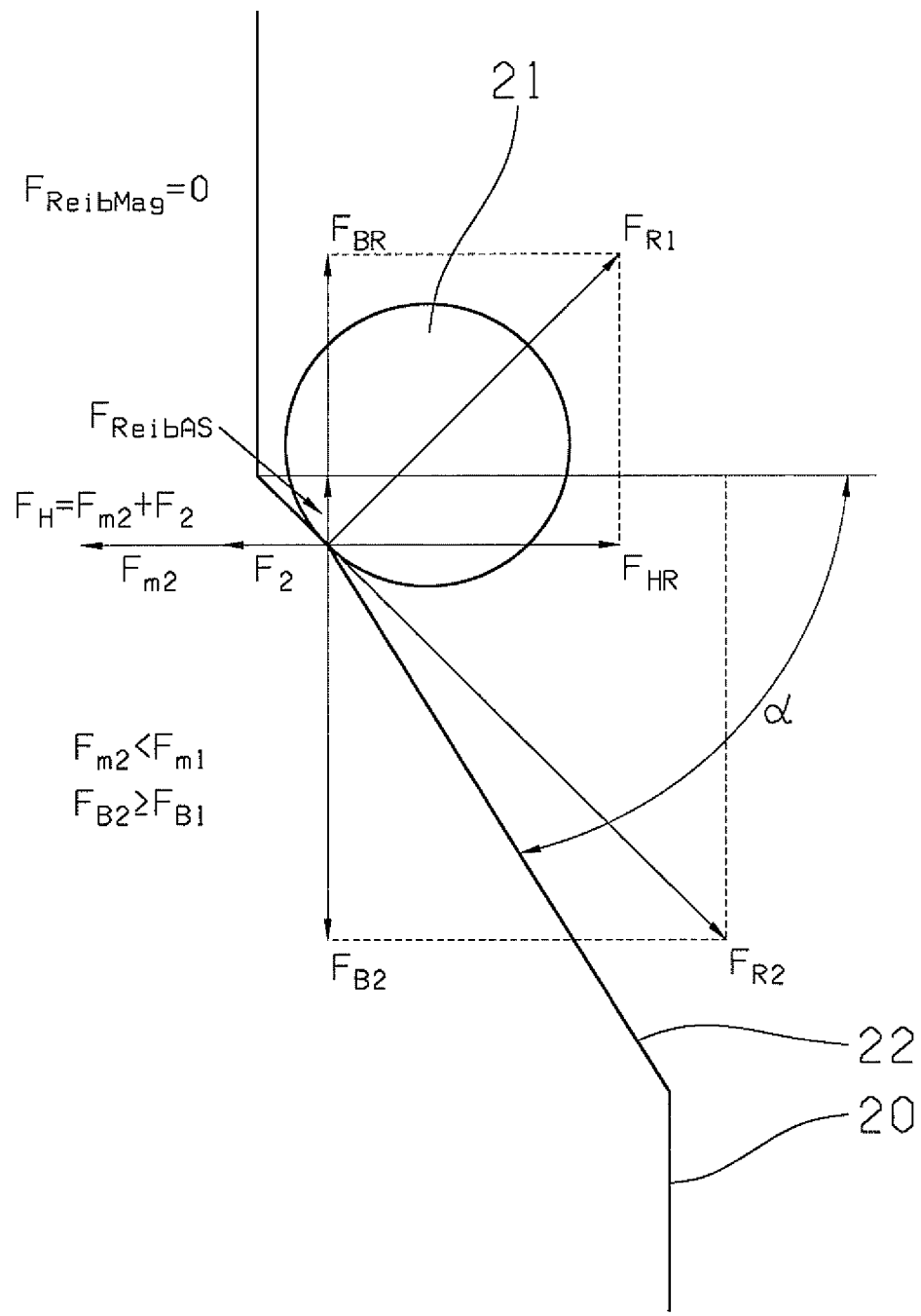
Figure 8:
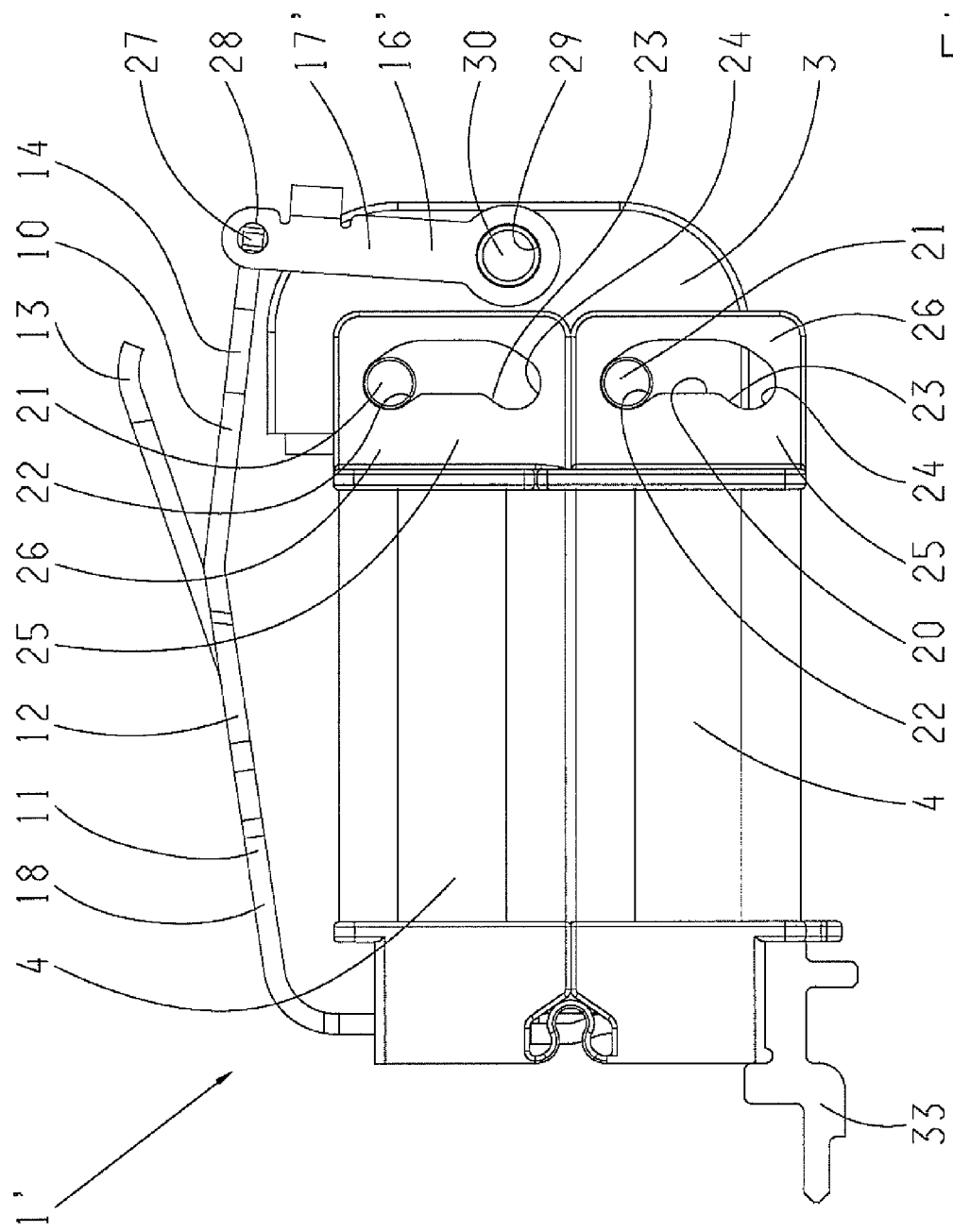
Figure 9:
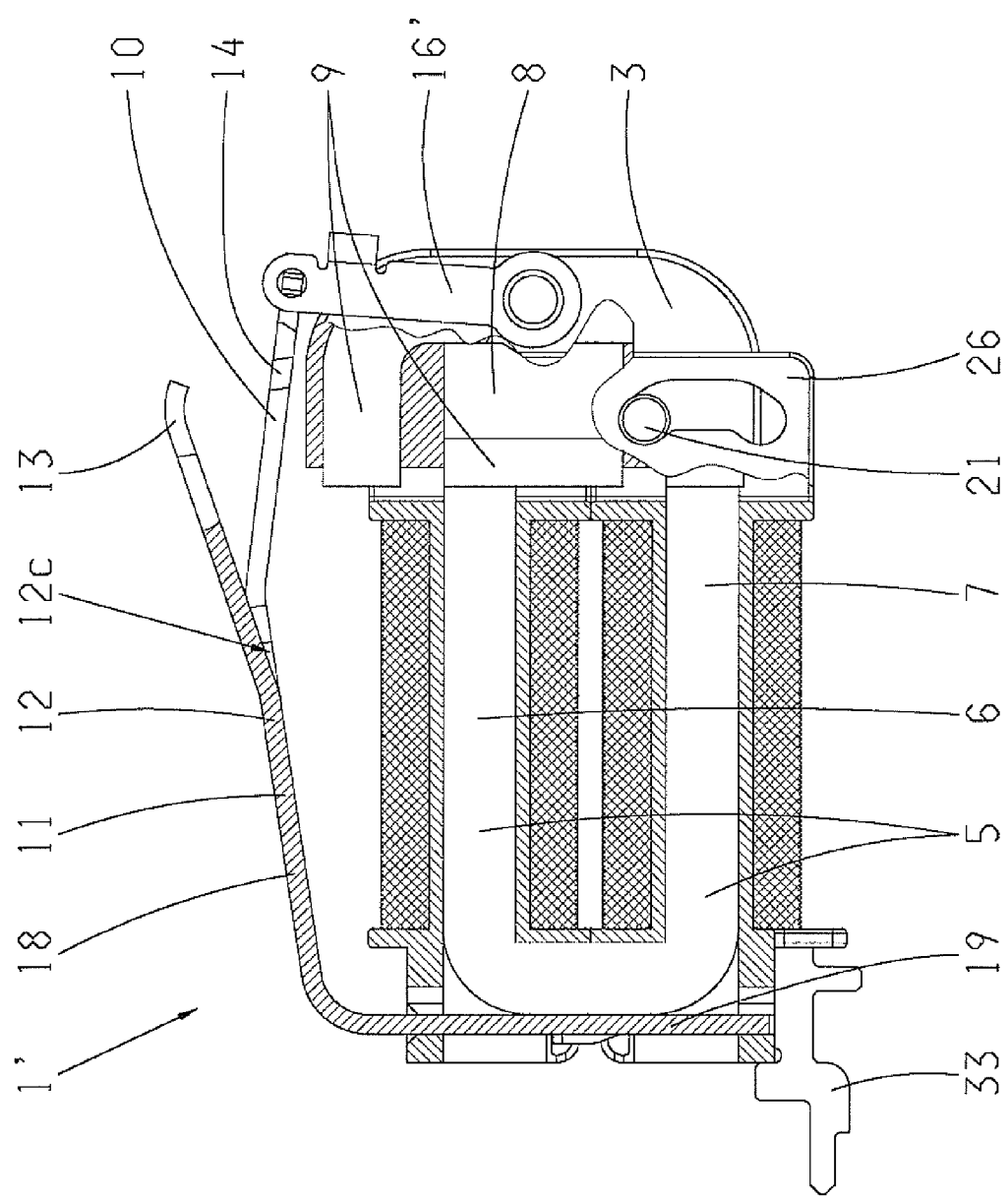
Figure 10:
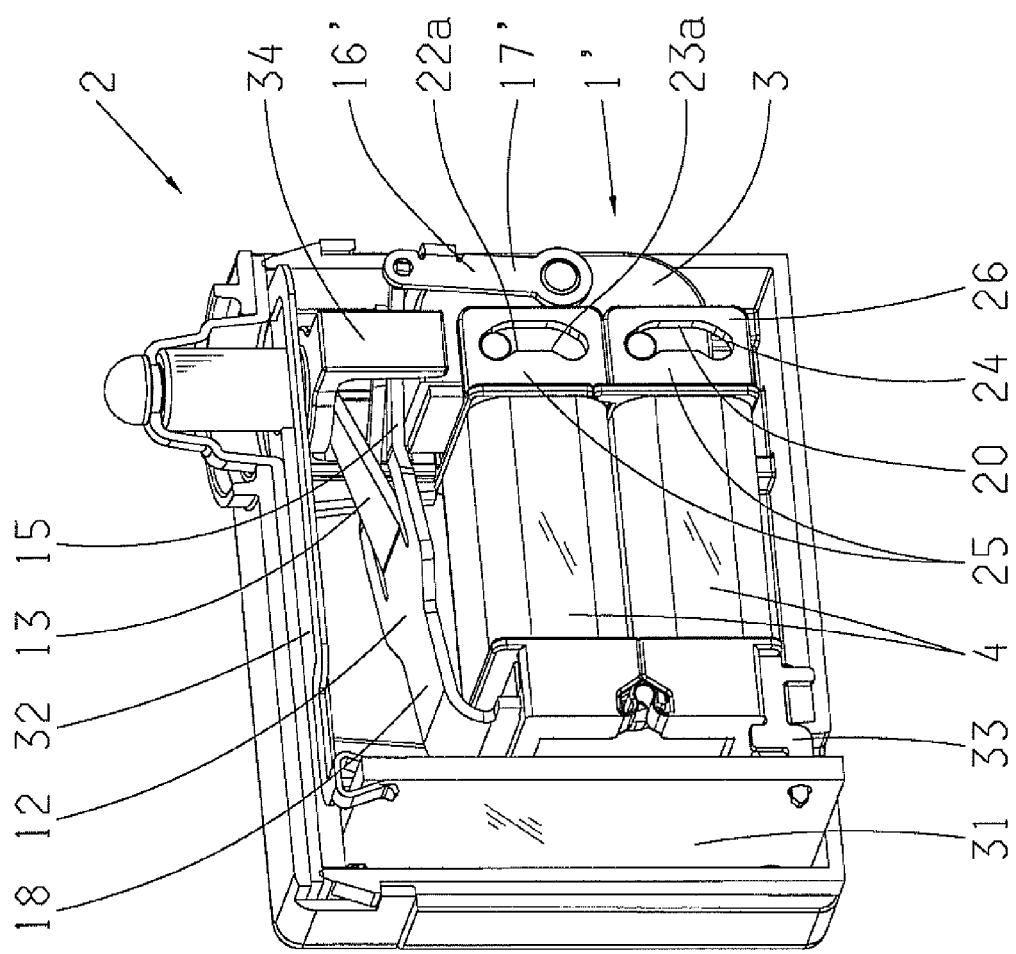
Figure 11:
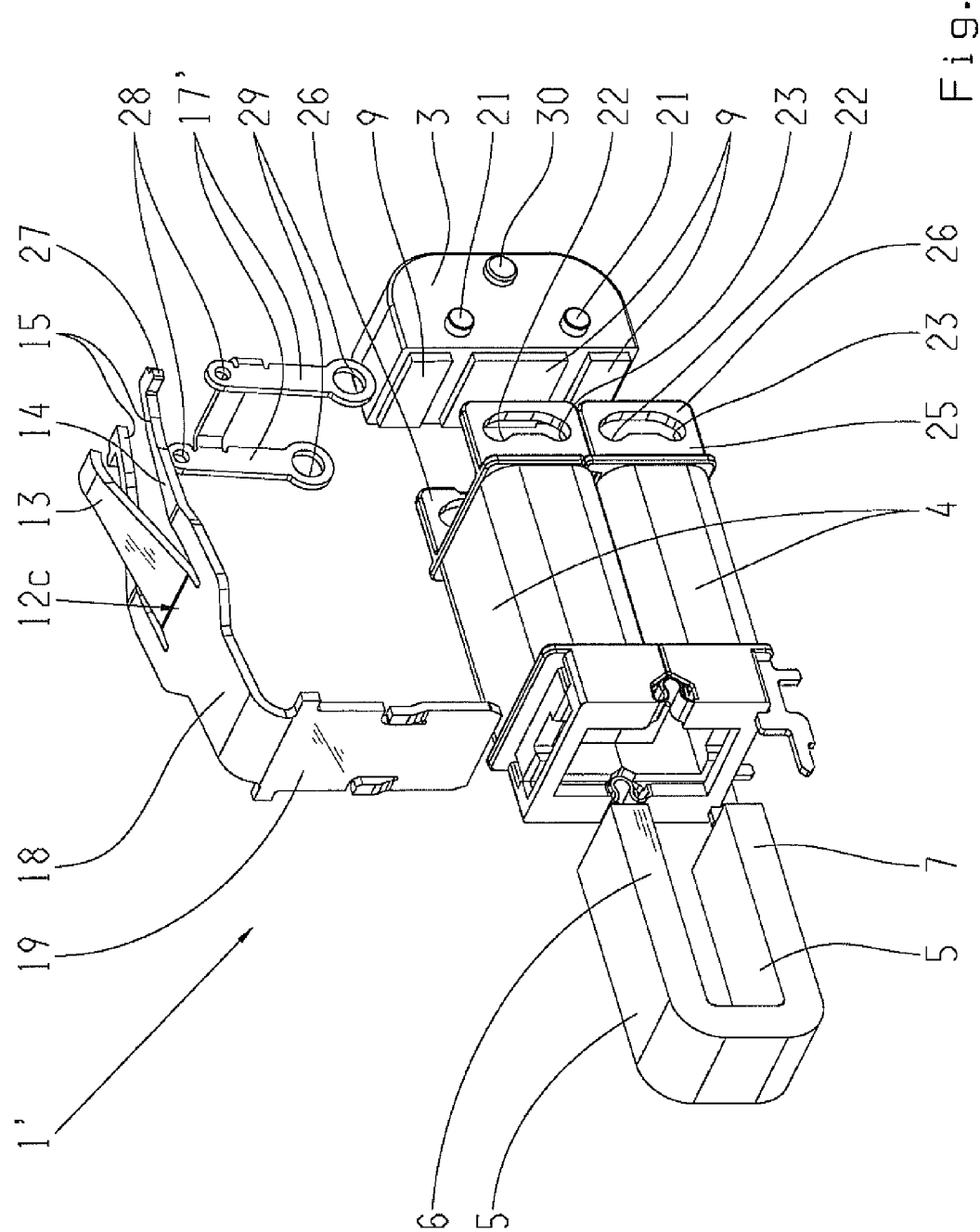
Figure 12:
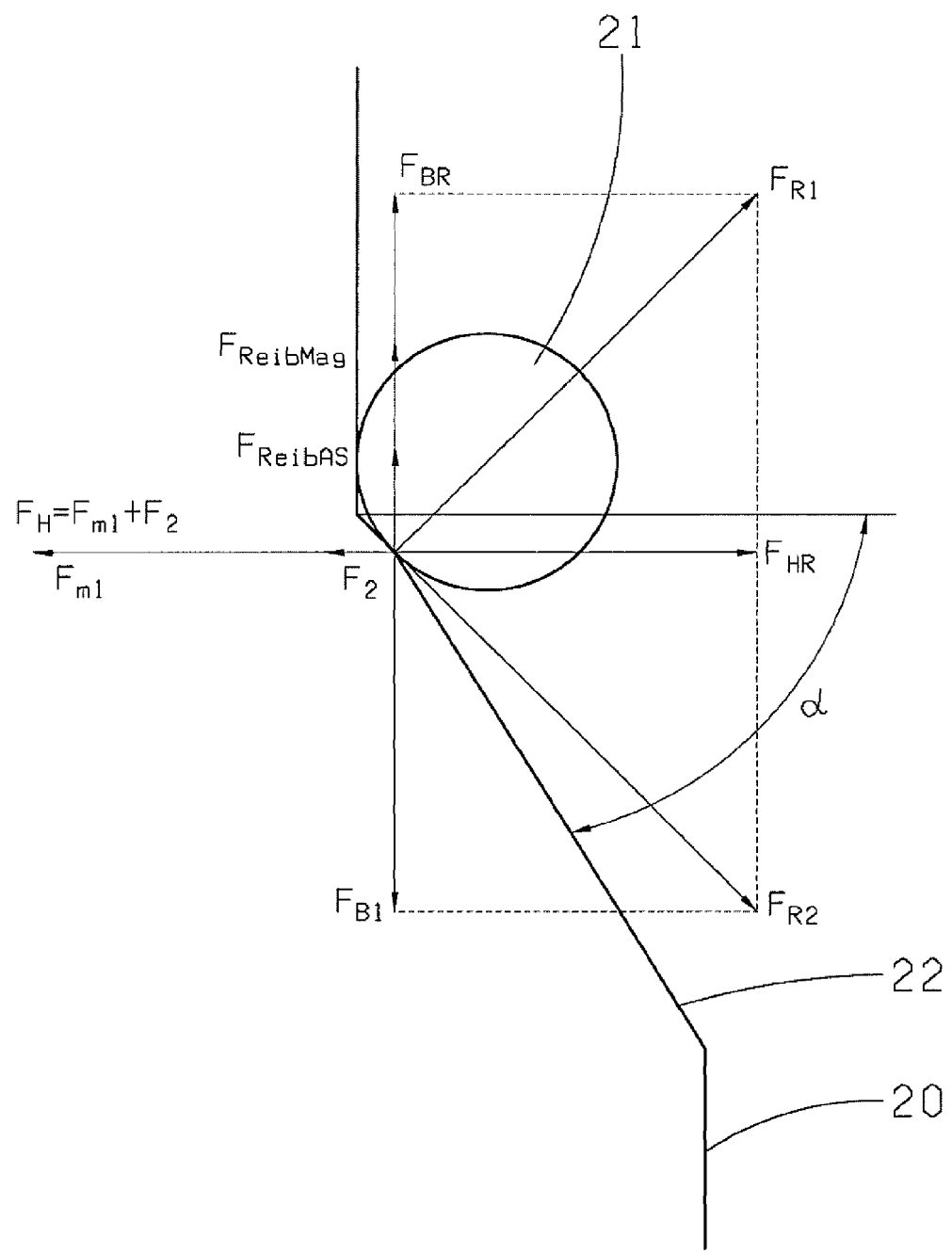
Figure 13:
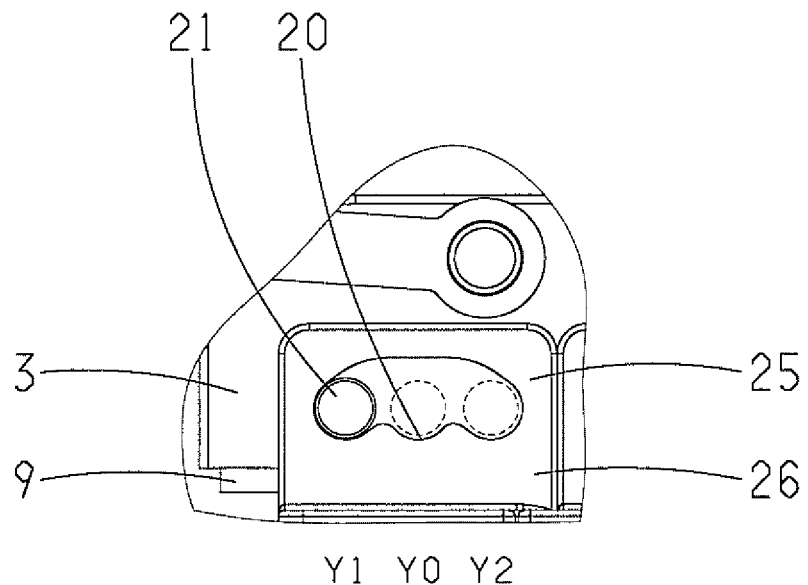
Figure 14:
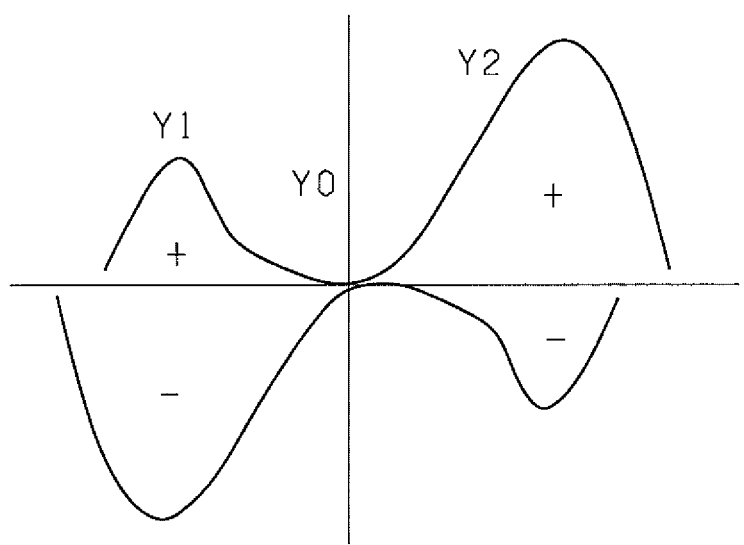

FIGS. 5a) to c) show example positions of the magnet element in a coil core according to an embodiment of the invention;

FIG. 6 shows an example of the situation of the forces relations in a rest position upon actuation of the induction generator in accordance with FIGS. 1 and 2;

FIG. 7 shows an example of the forces relations after leaving the rest position upon actuation of the induction generator in accordance with FIGS. 1 and 2;

FIG. 8 shows an example of an induction generator according to another embodiment of the invention;

FIG. 9 shows an example of a view of a partially cut induction generator shown in FIG. 8;

FIG. 10 shows an exemplary view of a radio switch with an induction generator according to FIGS. 8 and 9;

FIG. 11 shows an example of an exploded view of an induction generator in accordance with FIGS. 8 and 9;

FIG. 12 shows an example of the forces relations in a rest position upon actuation of the induction generator in accordance with FIGS. 8 and 9, and FIG. 13 shows, as an example, the signal course in the induction voltage in an induction generator with a metastable position according to a further embodiment of the invention;

FIG. 14 shows an example of a control profile of an induction generator with a metastable position by means of which a signal course of FIG. 13 is available.

In the following description and the drawings, the same reference numerals correspond to elements of the same or similar function.

Figure 3:
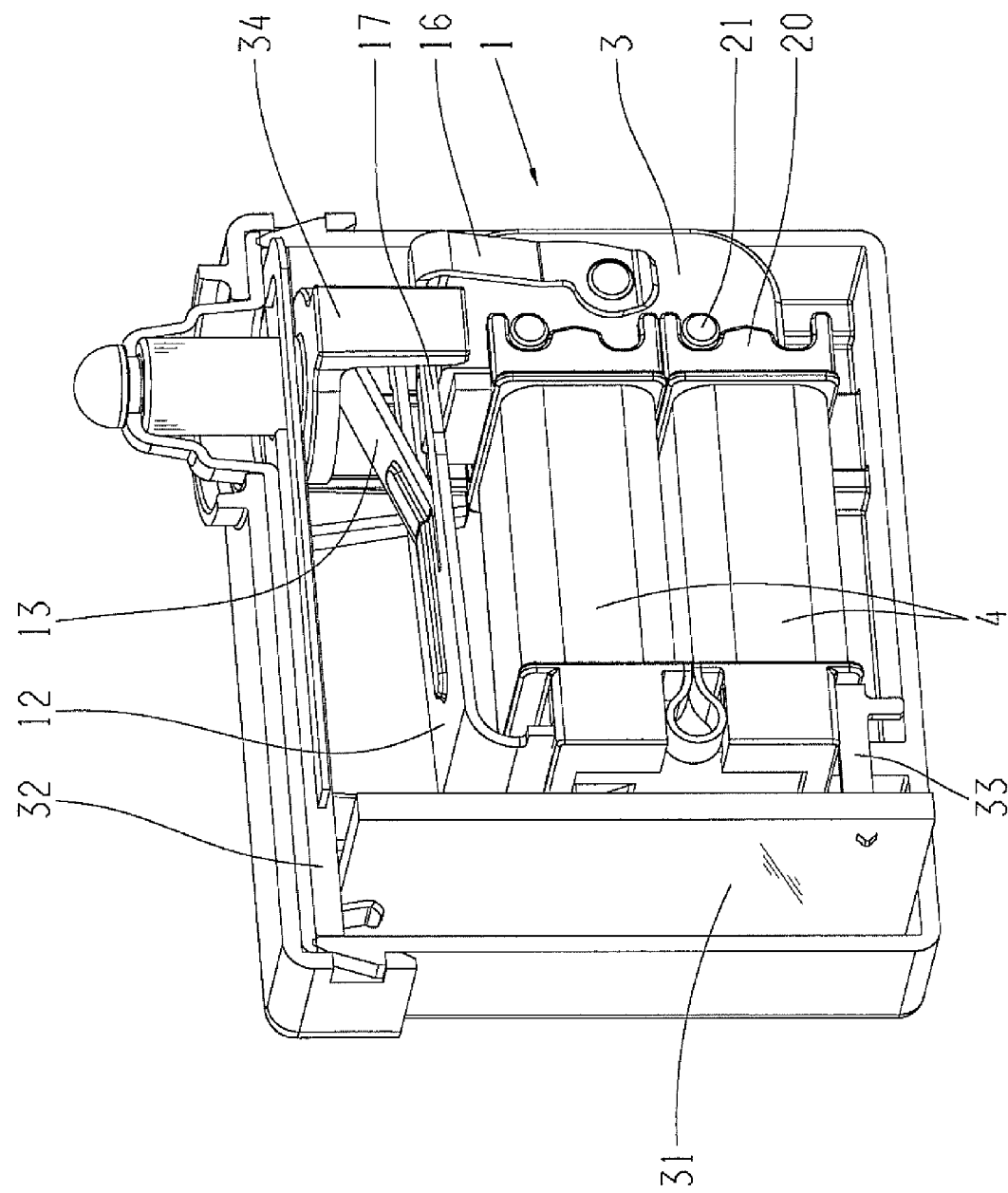
FIG. 3 shows an example of a radio switch, in cross-section, in which is retained an inventive induction generator according to FIGS. 1 and 2.

FIG. 1 shows an example of an embodiment of the invention of an induction generator 1, which, for example, can be used in a radio switch 2 (FIG. 3), in particular in a self-powered radio switch 2. The induction generator 1 allows the release of a very high amount of energy relative to the achievable degree of miniaturization. The induction generator can be designed extremely compact (FIG. 1), in particular, as an integral, one-piece module.

In order to generate energy, the novel induction generator 1 has a magnet element 3 with a permanent magnet, and at least one induction coil 4 (for example, FIG. 1, FIG. 8) with a U-shaped coil core 5 (for example, FIG. 2, FIG. 4, FIGS. 5a) to c)). According to the invention, the magnet element 3 is arranged adjacent to the induction coil 4, and is movable relative to the coil core 5, for example, on its end face 4a, in order to be able to generate a flux change in the core 5 and generate an induction voltage by means of the induction coil 4, which can be emitted to another assembly of a radio switch 2, for example, a transmission assembly. The coil core 5 has a first limb 6 and a second limb 7, relative to which the magnet element 3 is retained or fixed on the induction generator 1 in a movable mounting. The limbs 6, 7 extend in particular parallel to each other in the longitudinal direction, as shown in FIGS. 5a) to c).

The magnet element 3 is configured and retained at the induction generator 1 such that it can be forced to move between two defined rest positions Y1, Y2 and the limbs 6, 7 as a result of actuation of the induction generator 1, for reversing the polarity of the coil core 5, wherein the magnet element 3 in each rest position Y1, Y2 reaches a position where it rests on each of the two limbs 6, 7. In particular, it is envisaged that the magnet element 3 reaches contact with the limb end pointing away from the bottom of the U-shape element, in order to be able to fully magnetize the coil core 5 in each case, which for example, is exposed at the end face adjacent to the magnet element 3.

According to the invention, the induction generator 1 is in particular designed such that the magnet element 3 is displaceable in a direction relative to the limbs 6, 7, or the limb ends, in which the limbs 6, 7 are adjacent to each other, i.e., upon transfer from the rest positions Y1 to Y2 or vice versa. Such a shift could be mapped by a linear displacement of the magnet element 3. As part of the present invention, the term displacement direction denotes the direction, in which the magnet element 3 is shifted due to a transfer from a first rest position Y1 to the second rest position Y2; the term reverse displacement direction denotes the direction, in which the magnet element 3 is shifted as a result a transfer from the second rest position to the first rest position Y1, i.e., a direction which is opposite to the direction of original displacement. The displacement direction is illustrated as X, a reverse displacement direction is denoted as Y direction in FIGS. 5a) and c).

An interaction of the magnet element 3 with the limbs 6, 7 of the U-shaped coil core 5 in the defined first rest position Y1 and the defined second rest position Y2 is exemplified in FIGS. 5a) and c). In FIG. 5a), the magnet element 3 is located, for example, in the first defined rest position Y1 on the induction generator 1, corresponding to an initial position, in contact with the limbs 6, 7 of the U-shaped coil core 5, wherein the magnet element 3 forms three poles, adjacent to each other, of alternating polarity corresponding to the magnetic north (N) and south (S).

Figure 5B:
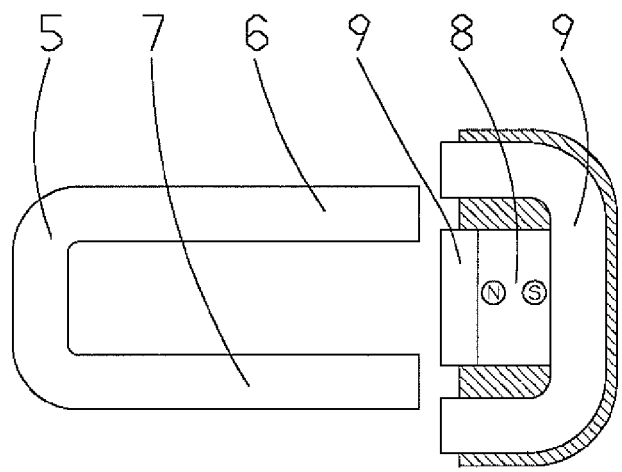
Figure 5C:
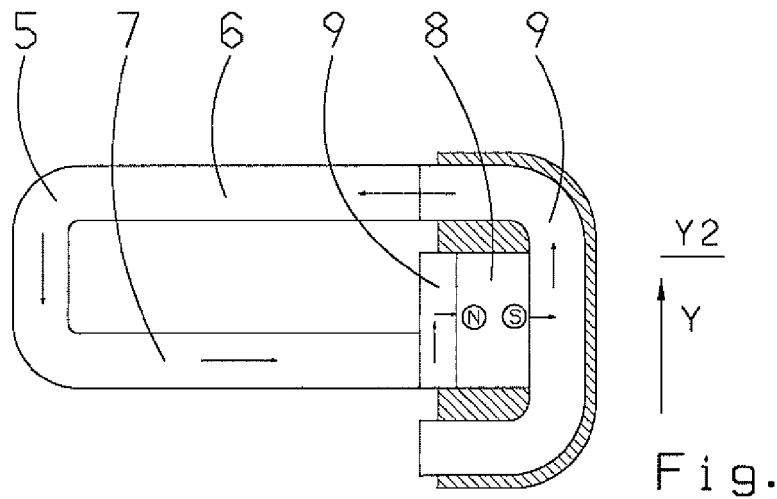

According to the invention, the first limbs 6 in the first defined rest position Y1 is opposite to a pole of the magnet element 3 of a first polarity, for example, magnetic north, and in the second defined rest position Y2 as shown in FIG. 5c, a pole of the magnet element 3 of the second polarity different from the first polarity, for example, magnetic south. The same applies to the second limb 7. The second defined rest position Y2 as shown in FIG. 5c is taken up according to the invention as a result of a forced movement of the magnet element 3 along the predetermined movement path from the rest position Y1, in particular during an operation of the induction generator 1.

In each defined rest position Y1, Y2, the magnet element 3 is, according to the invention, brought into contact with the limbs 6, 7, whereby in each case there results a closed annular magnetic flux through the magnet element 3 and the coil core 5. The flow direction in the first rest position Y1 is inverse to the second rest position Y2 (indicated by arrows in FIGS. 5a) and c)), corresponding to a polarity reversal of the coil core 5 as a result of a change of the rest positions, i.e., from Y1 to Y2 or vice versa.

Upon movement between the defined rest positions Y1, Y2, the magnet element 3 according to the invention is displaced in the displacement or reverse displacement direction, i.e., in a direction, in which the limbs 6, 7 are adjacent to each other, and for this purpose somewhat deflected, i.e., in the course of a movement from a rest position Y1 or Y2 to the other rest position Y2 or Y1 are distanced from the limbs 6, 7, and then turned in, i.e., moved closer to the limbs 6, 7. The movement path is predefined such that the magnet element 3 during a movement only in the first rest position Y1 and in the second rest position Y2 arrives to rest on the limbs 6, 7. A deflected position along such a predetermined movement path is shown, for example, in FIG. 5b.

In the context of the present invention, the term displacement denotes that the magnet element 3 is distanced from the limbs 6, 7, for example, in a horizontal direction, in a first direction, which is perpendicular to the displacement and return displacement direction of the limbs 6, 7. Displacement in this case denotes the movement, wherein the magnet element 3 is brought closer again to the limbs 6, 7 in the first direction.

According to the invention, between the first rest position Y1 and the second rest position Y2 there is defined an intermediate position along the movement path defined, in particular in each case adjacent to a rest position Y1, Y2, up to which the magnetic forces of the magnet element 3 during the movement from the rest position Y1 or Y2 decreasingly act on the coil core 5. Corresponding to the intermediate position, at which the magnet element 3 is already removed from the coil core 5 or brought out of engagement with it, i.e., is deflected, the magnetic forces suddenly stop acting on the coil core 5.

The invented induction generator 1 further comprises a first mechanical energy storage device 10, which is operatively connected to the magnet element 3. The first mechanical energy storage device 10 is provided to first store energy in the course of forcing a movement of the magnet element 3 from a rest position Y1 or Y2 in order to give it then to the magnet element 3 for a mechanical acceleration of it to the respective other rest position Y2.

Furthermore, in particular the induction generator 1 can comprise a second mechanical energy storage device, which is in particular intended to also store energy in the course of a movement of the magnet element 3, wherein the energy can then be given to the magnet element 3 in order to leave the second rest position Y2, i.e., to force it to a return movement to the initial rest position Y1.

Now, the operative connection of the first energy storage device 10 and the second energy storage device 11 with the magnet element 3 to force a movement of the magnet element 3 from the first rest position Y1 into the second rest position Y2 and vice versa will be explained.

In the initial rest position Y1, corresponding to the first rest position (FIG. 1, FIG. 5a)), the magnet element 3 is firmly held to the coil core 5 by means of magnetic force, optionally with the additional impingement with a biasing force. In the course of the enforcement of a movement, i.e., as a result of actuation of the induction generator 1, first the first mechanical energy storage device 10 or the second mechanical energy storage device 11 is acted upon by an actuation force such that the first mechanical energy storage device 10 or the first mechanical energy storage device 10 and the second mechanical energy storage device 11 increasingly store actuation energy. From the point of exceeding a certain set energy level of the first mechanical energy storage device 10 or the first mechanical energy storage device 10 and the second mechanical energy storage device 11, the magnet element 3 be brought from the initial rest position Y1 under continued actuation, wherein it is forced to a movement along the movement path. A displacement from the rest position Y1 can be achieved, for example, by means of the first energy storage device 10, which is operatively connected to the magnet element 3.

The movement path is pre-determined such that, with continued introduction of the actuation force, detachment or lifting of the magnet element 3 from the coil core, i.e., a displacement, takes place. After reaching an intermediate position defined along the movement path, at which the magnetic forces suddenly subside, now an unhindered movement can continue along the movement path predetermined according to the invention, in particular in the displacement direction, during which the magnet element 3 is brought into the second rest position Y2.

The first energy storage device 10 is so inventively operatively connected to the magnet element 3, which can be displaced along the movement path in the displacement direction (and the return displacement direction) such that after a movement or a displacement past the intermediate position, i.e., after leaving the intermediate position, the stored energy can be given to the magnet element 3, wherein in particular a force is generated and applied on the magnet element 3, which acts on the magnet element 3 in addition to the actuation force that acts on the magnet element 3 in the displacement direction X. The rapid movement of the magnet element 3 along the movement path, which is composed of a displacement motion, a motion in the displacement direction X and a turn-in motion, which is made possible from the intermediate position, is so far mechanically also greatly accelerated. This allows the induction system to generate a high amount of energy due to the rapid rapprochement of the magnet element 3 to the coil core 5.

During the movement into the second rest position Y2, the second energy storage device 11 that is possible according to the invention can continue to increasingly absorb energy. By means of the stored energy of the second energy storage devices 11, a movement of the magnet element 3 can now be forced from the second rest position Y2, i.e., eliminating the need for actuation. In the course of enforcing a movement from the second rest position Y2, the first energy storage device 10 again stores energy before a movement of the magnet elements 3 can be initiated to the first initial rest position Y1. In this process, first an intermediate position is taken up along the defined path.

From leaving the other intermediate position adjacent to the second rest position Y2, the taking up of which is defined by the movement path, first mechanical energy storage device 10 operatively connected to the magnet element 3 can now again give the stored energy to the magnet element 3 for a mechanical acceleration of the displacement on the magnet element 3 into the other rest position Y1, i.e. in the reverse direction Y.

According to the invention, the first mechanical energy storage device 10 and/or the second mechanical energy storage device 11 are each formed as separate spring elements, for example, as a leaf-shaped spring elements or as coil springs. The first mechanical energy storage device 10 and the second mechanical energy storage device 11 are integrally formed, for example, as a stamping-bending component, for example, to be made of a spring material. According to the invention, the discharging of the energy stored in the first energy storage device to the magnet element 3 in each case occurs by leaving its intermediate position.

FIGS. 1, 2, 3, 4 show an example of an inventive induction generator, which has in particular a one-piece spring element 12, which comprises an integrally formed first energy storage device 10 and a second energy storage device 11, wherein, according to the invention, the first energy storage device 10 is operatively connected to the magnet element 3 for the release of stored energy after the magnet element leaves the intermediate position. The spring element 12 is essentially formed bow-shaped or U-shape, whereby it is fixed with a first bow end 12a on the induction coil 4 and with a second bow end 12b is operatively connected to the magnet element 3, in particular articulated thereto. Between the bow ends 12a, 12b, there extends the spring element 12 essentially in the longitudinal direction along the induction coil 4, for example, ridge-shaped.

The spring element 12 comprises a force-introduction area 12c, which is provided for introducing an operating force, in particular for example a middle area. A force introduction element 13, for example, a tongue is provided on the spring element 12 or the spring clip, for example, formed integrally therewith, to introduce force into the force-introduction area 12c, the tongue can act together with an actuating device of a radio switch 2. The spring element 12 forms, for example, an actuator of the induction generator 1, in particular in connection with the force introduction element 13.

The invention provides that by introducing force into the force-introduction area 12c, both the first energy storage device 10 and the second energy storage device 11 store energy, for example, in each case by elastic deformation of the spring element, as explained below.

In embodiment shown for example in FIG. 1, the first mechanical energy storage device 10 of the induction generator 1 is formed as a first spring element 14, thus as the first section of the spring element 12, for example, as an essentially leaf-shaped spring. The first spring element 14, thus the first section of the spring element 12, extends in this case from the force-introduction area 12c that is intended for introducing force toward the magnet element 3, in particular for example placed across space so that the magnet element 3 is overlapped. In FIGS. 1 and 2 the first section extends in the longitudinal direction, for example, to the end of the induction coil 4 that is adjacent to the magnet element 3 such that a connection to the magnet element 3 is made possible, which permits introduction of force into the magnet element 3, in particular in the direction of displacement and return displacement direction. According to the invention, such force introduction allows, according to the invention, a movement of the magnet element 3 from the rest position Y1 or Y2, and in particular the displacement in a direction, in which the limbs 6, 7 are adjacent to each other.

The first spring element 14, thus the first section of the spring element 12 is provided for storing the energy arising due to elastic deformation in the course of forcing a movement of the magnet element 3, for example for elastic bending. In this case, such bending is provided or made possible by introducing an operating force into an end section 14a of the first section, which corresponds to the force-introduction area 12c of the spring element 12 and is in particular formed integrally with the second energy storage device 11.

The first spring element 14, thus the first section of the spring element 12, is formed in particular in the form of at least one spring arm 15, in this case in particular in the form of two spring arms 15, which for example can be formed in each case rod-shaped or spike-shaped.

The first spring element 14, thus the first section of the spring element 12, corresponding to the first mechanical energy storage device 10, is operatively connected to the magnet element 3 by means of at least one connecting element 16, in particular in the form of a downwardly projecting arm 17, and is provided to transfer, by means of the connecting element 16, both a force in the direction of displacement or reverse displacement direction and a torque in order to force a movement of the magnet element 3. The connecting element 16 forms the second bow end 12b of the spring element 12, which is connected to the magnet element 3. The connecting element 16 or the at least one arm 17 is in particular, for example, hinged to the magnet element 3. The connecting element 16 is formed, for example, as a rigid element and is formed in particular integrally with the first spring element 14, thus the first section of the spring element 12.

According to the invention, it is for example provided that the magnet element 3 is connected, by means of two connecting arms 17, to the first spring element 14, thus the first section of the spring element 12, in particular to connect in each case a respective arm 17 to a respective spring arm 15, wherein the arms 17 are hinged in particular on both sides of the magnet element 3 in the transverse direction such that any tilting of the magnet elements 3 during its movement is prevented. In the embodiment shown, a biasing force generated by the first spring element 14, thus the first section of the spring element 12 is exerted on or transferred to the magnet element 3 by means of at least one arm 17 such that the magnet element 3 is pressed in the direction of the induction coil 4. This avoids that the magnet element 3 in the course of a displacement removes itself from the coil core 5 so that returning is difficult.

The second mechanical energy storage device 11 is also formed as a spring element, in particular as a section of the spring element 12, and subsequently is referred to as the second section of the spring element 12 or the second spring element 18. The second mechanical energy storage device 11 is formed, for example, as a substantially leaf-shaped spring, for example as a spring bar. The second spring element 18 or the second section of the spring element 12 is in particular formed integrally with the first spring element 14 or the first section of the spring element 12. The second spring element 18 or the second section of the spring element 12 is provided in particular for elastic deformation as a result of actuation, i.e., for elastic bending. Alternatively, to form an induction generator 1 and a radio switch 2, which does not provide for the magnet element 3 to be moved from the second rest position Y2 by a second mechanical energy storage device, a second mechanical energy storage device 11 may be eliminated, wherein instead, for example, a rigid element, which is hinged to the induction coil 4, is provided, wherein the rigid element may be formed integrally with the first section 14.

An energy storage in the course of forcing a movement from the first rest position Y1 into the second rest position Y2 is, in this case, allowed or provided for by introducing an actuating force into an end section 18a of the second spring element 18 or the second section of the spring element 12, which is corresponding to the force-introduction area 12c of the spring element 12 and is formed in particular integrally with the end section 14a of the first energy storage device 10, i.e., forms with it a connection area.

The second spring element 18 or the second section of the spring element 12 is supported on the longitudinal end the induction coil 4 that is facing away from the magnet element 3 in order to allow a bending that corresponds to the introduced actuating force, wherein the second spring element 18 or the second section of the spring element 12, for example, for supporting forms an integrally formed downward projecting support element 19, that corresponds to a first bow end 12a of the spring element 12. Alternatively, for example the induction coil 4 can be formed as a support for the second spring element 18 or the second section of the spring element 12. According to the invention, the first and second spring elements 14, 18 or the first and second sections of the spring element 12, which are designed for energy storage, together essentially form a spring strip, in particular a spring strip that is provided for substantially central force introduction, wherein its ends are connected to the induction coil and the magnet element 3.

According to the invention it is provided that an actuating force $F_B$ is introduced into the force-introduction area 12c of the spring element 12 for the actuation of the induction generator 1 by means of the spring element 12, in the course of which a movement of the magnet element 3 between the rest positions Y1, Y2 is enforceable, wherein the magnet element 3 is located in particular in the first rest position or the initial position Y1 (position shown, for example, in FIGS. 1, 2), i.e., it is magnetically held on the coil core 5.

By the introduction of the operation force into the force-introduction area 12c, the first and the second sections of the spring element 12 or the first spring element 14 and the second spring element 18 are in each case first subjected to a bending, the extent of which is greatest at the ends 14a, 18a that are facing the force-introduction section 12c, i.e., a bend in the connecting region. In the course of the respective through-displacement or an elastic deformation, both the first energy storage device 10 and the second energy storage device 11 store actuating energy independently from each other. In order to allow bending the first and the second sections or the first and the second spring elements 14 to permit 18, the spring element 12 is in this case suitably supported with a distance from the induction coil 4, i.e., on the magnet element 3 held in particular by the magnetic force to the coil core 5.

On reaching or exceeding the storable amount of energy, more particularly on exceeding the amount of energy stored in the first section or in the first spring element 14, or of an intended elastic deformation, which for example leads to a jointly formed U-shape or a V-shape of the integrally formed first and second spring elements 14, 18 and the first and second sections of the spring element 12, a continued introduction of the actuating force can now occur in an increased, in particular full extent be transferred to the magnet element 3, by means of the spring element 12, in particular by means of the connection elements 16 in, for example, the form of the arm 17, i.e., in the displacement direction.

Due to the now reinforced actuating force introduced into the magnet element 3, a movement of the magnet element 3 can be forced, i.e., the magnet element 3 is pushed from its initial position Y1 along the predetermined movement path.

According to the invention, the movement path between the rest positions Y1 and Y2, and vice versa, is pre-determined such that with continued actuation or a continued enforcement of a movement, first a release of the magnet element 3 from the coil core 5 (displacement) and the accompanying or following movement in a direction, in which the limbs 6, 7 are adjacent to one another (shift direction and back shift direction), and furthermore reaching an in-contact position on the coil core 5 in the rest positions Y1 and Y2 to be taken up (turn-in). By means of the displacement, the intermediate position can be achieved, after the overcoming of which a rapid movement of the magnet element 3 is largely possible without hindrance from the magnetic holding forces. After overcoming the intermediate position, in particular the movement in the shift direction or in reverse direction of the shift is supported by the stored energy of the first energy storage device 10 by mechanical acceleration, in particular as a result of a sudden release of energy.

According to the invention, to set such a movement path, the induction generator 1, in particular for example the at least one induction coil 4, forms together with the magnet element 3, in particular a cam control (as, for example, shown in FIGS. 1, 3, 4), which is formed by means of a latching profile or a control profile 20 and an element 21 that is guided along the control profile, in particular an engaging element 21.

Figure 4:
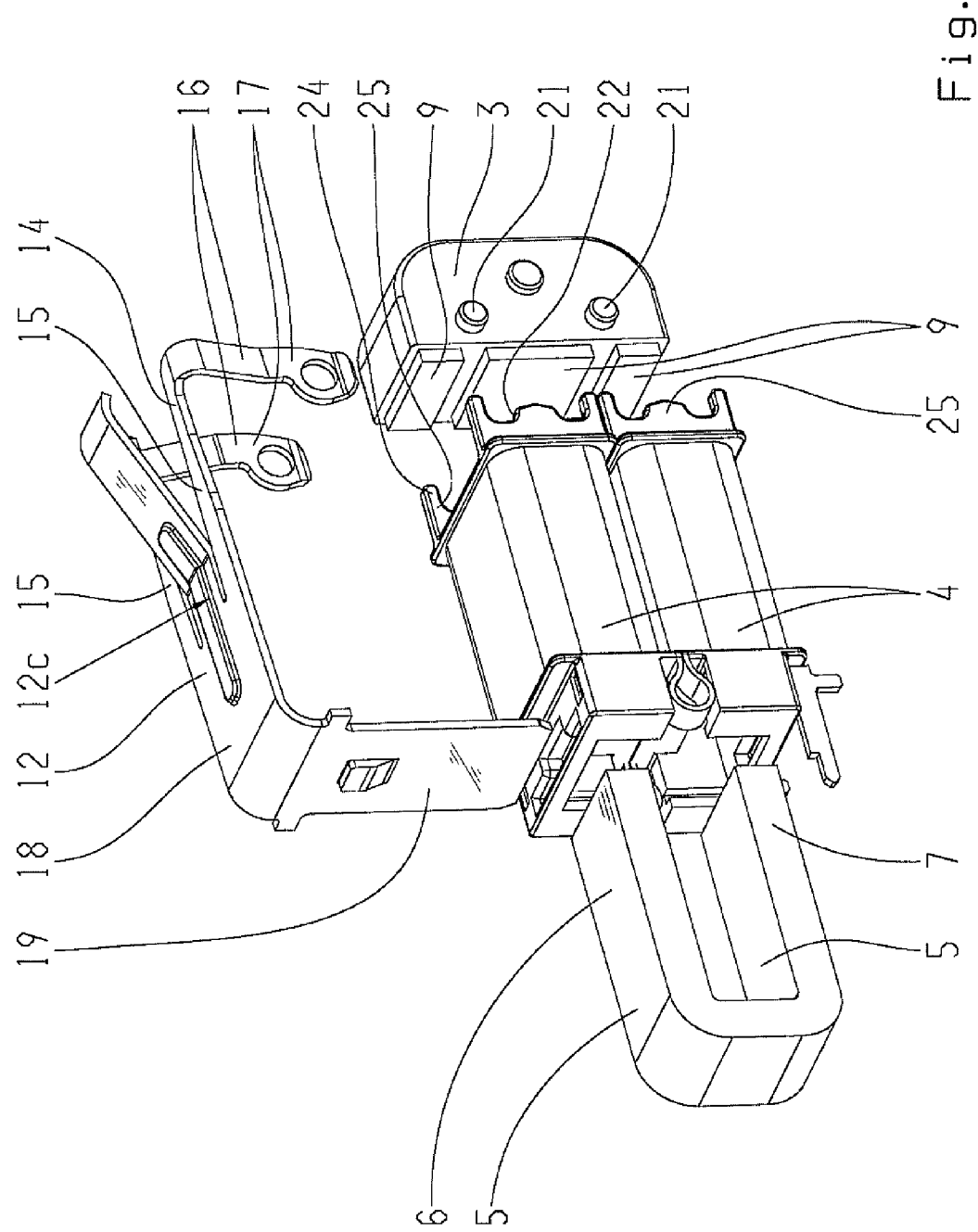
FIG. 4 shows an example of an exploded view of the induction generator in accordance with FIG. 1 or 2.

A suitable movement path or a suitable control profile 20, which makes possible a displacement of the magnet element 3 into the defined intermediate position, and a further mechanically accelerated movement into the other rest position Y1 or Y2 after leaving the intermediate position, according to the invention, as shown in FIG. 1 or 4, a movement path or a control profile 20 with a first bevel 22 and a second bevel 23, which correspond to each other, i.e., correspondingly a rising and a falling ramp, for example, a circular arc or an A-shaped movement path, wherein between the closely spaced bevel ends 22a, 23a, for example, a plateau may be formed, is at least one extreme value.

The bevels 22, 23 each serve to displace the magnet element 3 from a rest position Y1 or Y2 at the introduction of a force, i.e., a force continued to be introduced, after filling the first energy storage device 10 or the first energy storage device 10 and the second energy storage device 11, acting in the direction of displacement and in the return displacement direction, which pushes the magnet element 3 against the bevel 22 or 23 so that the magnet element 3 is forced to move along the bevel, in particular to take up the defined intermediate position. Furthermore, the bevels 22, 23 are intended to achieve a turn-in. To this end, the bevels 22, 23 are provided at the beginning and the end of the movement path.

The cam control, in particular the control profile 20, further comprises, for example, a first and a second stop element 24, which limit the movement path of the magnet element 3 respectively and inasmuch define the rest positions Y1, Y2, for example, in the form of rest seats, in which the magnet element 3 is in contact with each of the limbs 6, 7, as stable rest positions.

In the present case, for example, the induction coil 4 comprises an element that forms the control profile 20, hereinafter referred to as the control cam carrier 25. The control cam carrier 25 is formed in particular opposite the magnet element 3, wherein the control profile 20 is located opposite to the magnet element 2 at the end face 4a of the induction coil 4 such that the engaging element 21 can be guided by it. The magnet element 3 comprises the corresponding engaging element 21, for example, at least one pin. The engaging element 21 is in particular pressed against the control profile 20 by a bias of the connecting element 16.

According to the invention, it is also possible to form the control profile 20 on the magnet element 3, for example, integrally therewith, and the engaging element 21, for example, on the induction coil 4. During a movement along the movement path predetermined by the control profile 20, the magnet element 3 is preferably supported such that tilting is prevented and a good guidability is made possible. For this purpose, the control profile 20 or the engaging element 21 is formed, for example, in transverse direction on both sides of the induction coil 4 or the magnet element 3, in particular, for example, identical. For example, a single control cam carrier 25 with two control profiles 20 that are adjacent to each other in the transverse direction can be used.

In the present case, the induction generator comprises, for example, two vertically arranged induction coils 4 or a double coil 4, which, for example, encloses in each case a limb 6 or 7 of the coil core 5. On each induction coil 4, a control cam carrier 25 is arranged with a control profile 20 identical to the adjacent induction coil 4. Each control profiler 20 is assigned a guided engaging element 21 of the magnet element 3 so that a reliable guidance of the magnet element 3 along the movement path is made possible.

Subsequently, the inventive functionality of the induction generator 1 shown in FIGS. 1 to 4 will be explained. In this context, we refer in particular to FIGS. 6 and 7, which represent the relations of forces before reaching the intermediate position (FIG. 6), and after leaving the intermediate position (FIG. 7).

At the beginning of the introduction of an actuating force to force a movement of the magnet element 3, initially the spring element 12 is elastically deformed, i.e., the first and second sections each storing energy. After reaching a certain deformation, accompanied with a higher bending stiffness of the spring element 12 or the first and second sections or of said first spring element 14 and the second spring element 18, the actuating force is now transmitted to the magnet element 3. Thus, the magnet element 3, which is now being biased in the direction of displacement X with an actuation force, is pushed against the bevel 22. The bevel 22 guides the magnet element 3 on a movement path, which forces a displacement, i.e., taking up the intermediate position, by means of the introduced force.

Up to the intermediate position, for example, the deflection of the spring element 12 is substantially maintained. From the intermediate position, i.e., after overcoming the magnetic holding force, however, there occurs a rapid movement of the magnet element, coupled with a strong displacement. As a result of the recovered motion free space in the displacement direction in the course of the movement, the first spring element 14 or the first section of the spring element 12 that is supported in the connection area on the second spring element 18 or the second section of the spring element 12 can relax and thus accelerate the magnetic element 3.

FIGS. 6 and 7 each show an example of an engaging element 21 in contact with a bevel 22, wherein a displacement due to the introduction of an actuating force acting the direction of displacement is intended. In FIG. 6, the engaging element 21 or correspondingly the magnet element 3 is in the rest position Y1, while in FIG. 7 it is already deflected, in particular is in a position, in which the energy stored according to the invention in the first energy storage device 10 is being given to the magnet element 3 in the displacement direction X to accelerate the displacement of the magnet element 3 into the rest position Y2.

The spring element 12 arranged at the induction coil 4, in particular the first section, is at rest or in a non-actuated state being biased with a certain force F. The force F pushes, by means of the connecting element 16, the magnet element 3 connected thereto in reverse direction of displacement into the first rest position Y1. The first section of the spring element 12 is biased so that the engaging element 21 and accordingly the magnet element 3 is pushed against the control profile 20. This biasing force is referred to herein as $F_2$.

In this rest position Y1, the engaging element 21 is in, for example, a locked state with the control profile 20, for example, in contact with a stop element 24 of the control profile 20 and in contact with the adjacent bevel 22.

If now the force $F_{B1}$, corresponding to an actuation force (see FIG. 6), acts in the direction of the displacement on the force-introduction area 12c, for example, by means of the force introduction element 13, in particular for example the tongue of the spring element 12, first actuation energy is stored in the first energy storage device 10, whereupon the magnet element 3 is forced increasingly against the bevel 22 in order to deflect it.

The actuation force $F_{B1}$ (FIG. 6) and a resultant holding force $F_H$ generate, at the contact point between the engaging element 21, for example, the pin, and the control profile 20 or the bevel 22, a reaction force $F_{R1}$, which according to the parallelogram of forces is composed of $F_{BR}=F_B$ (with $F_{BR}$ containing the friction force $F_{ReibMag}$ between the magnet element 3 and the coil core 5, and $F_{ReibAS}$ between the magnet element 3 and the bevel 22 or the ramp). The resultant force $F_{R1}$ acts always perpendicular to the surface of contact at the control profile 20 and is dependent on the angle a according to the force parallelogram rule (friction force or frictional path are dependent on a).

With the increase of the actuating force $F_{B1}$ also increase the reaction forces $F_{R1}$, $F_{R2}$ and $F_{HR}$. Once $F_{HR}$ exceeds $F_H$, the balance is lost and the magnet element 3 sets in motion along the control profile 20 or the traction control bevel 22. This occurs when the frictional force $F_{ReibMag}$ goes toward zero and the magnetic force $F_{M1}$ continuously decreases (FIG. 7).

The intermediate position according to the invention is now taken up, where the frictional force decreases toward zero and the magnetic holding force $F_{m1}$ with increasing distance disproportionately or suddenly decreases (the engaging element 21 or the pin is at a minimal distance from the control profile with the friction force equal to zero). The force $F_{R1}$ will significantly diminish, while $F_{R2}$ remains at least the same. Thereby, the equilibrium is violated, so far as the first mechanical energy storage device 10 or the first section of the spring element 12 has already stored the corresponding amount of energy and now can mechanically accelerate the magnet element 3, in which the energy from the first energy storage device 10 or the first section of the spring element 12 is released. This corresponds to the intermediate position.

The necessary force $F_B$ for switching or for movement in the other rest position Y2 is accumulated in the spring arm 15 of the spring element 12 only when reaching the actuating path. The actuation path is roughly equal to the raster path of the magnet element 3.

After leaving the intermediate position, the magnet element 3 can now be brought to the other rest position Y2 with very little resistance (which is mainly caused by the force $F_2$), i.e., the approach bevel 22 can be overcome and the magnet element 3 can be deflected along the further approach bevel 23, wherein at the same time there occurs a displacement in a direction, in which the limbs are adjacent to each other. The force $F_{B2}$ stored in the first energy storage device 10, which also acts in the direction of displacement, provides for a very strong acceleration and a sudden movement of the magnet element 3 into the other rest position Y2. To this extent, the magnet element 3 is mechanically accelerated by the stored energy of the first mechanical energy storage device 10 into the other rest position Y2 or Y1 after leaving the intermediate position.

During the movement along the movement path or the control profile 20 the force $F_B$ subsides or goes virtually to zero in the second rest position Y2, corresponding, for example, to a second switching position of a radio switch 2. When approaching the second rest position Y2 or turning into the second rest position Y2, the magnet element 3 is again pressed against the coil core 5 due to the force $F_2$, i.e., the biasing force.

During an approach of the magnet element 3 to the coil core 5 as predetermined by the movement path, the increasing magnetic force Fm will connect the magnet element 3 to the coil core 5 also fast such that a closed magnetic flow streaming opposite to the first rest position Y1 ceases. Due to the inventive, highly accelerated movement of the magnet element 3 between the rest positions Y1, Y2, therefore a very high amount of energy is generated.

Here, after turning into the second rest position Y2, wherein the engaging element 21 reaches contact with the contact element 22, the spring element 12 can be further actuated, wherein, for example, the spring element 12 is further elastically deformed. This actuation path is called overtravel, which is usually necessary to compensate for the movement path tolerances in the applications.

A movement of the magnet element 3 from the second rest position Y2 into the first rest position Y1 is affected on the same principle as previously described. The actuation force $F_B$ is in the second rest position Y2 reduced or eliminated. A movement from the second rest position Y2 back into the first rest position Y1 is forced by the restoring force F that is stored in the second section 18, and which acts on the magnet element 3 in return displacement direction, and which, prior to a movement to the first rest position Y1, is converted into a reverse bias of the first section of the spring element 12, in particular of the spring arms 15, i.e., the first mechanical energy storage device 10 first stores energy again, i.e., in particular by bending, wherein the bending occurs in particular in the opposite direction.

After reaching the other intermediate position, which is taken up adjacent to the second rest position Y2 by means of the further approach bevel 23, the energy stored in the first storage device 10 or in the first section of the spring element 12 can now in turn be suddenly released or transferred to the magnet element 3 such that a transfer to the first rest position Y1 can again occur, being mechanically accelerated by the stored energy of the first storage device 10.

The sudden release of the energy stored in the first energy storage device 10 in the form of the first section of the spring element 12 can, for example, again occur by a sudden discharge of the first section of the spring element 12 previously loaded by the actuating force and to this extent elastically bent, for example, by a sudden reverse bending like, for example, the stress relief of a bow after releasing the bowstring.

A reverse bend or a stress relief of the first section of the spring element 12, corresponding to a release of energy is made possible, for example, in the course of increasing fast displacement, caused by the respective bevels 22, 23 corresponding to overcoming the intermediate position.

The FIGS. 8, 9 and 11 show the example of a further embodiment of an inventive induction generator 1', which is provided for forming a radio switch 2, as shown in FIG. 10. The induction generator 1' requires no biasing force to lead the magnet element 3 along the movement path. Thus, the magnet element 3 can be deflected or be forced to move by expending a lower actuating force, with an equally high amount of energy being achieved.

For this purpose, the induction generator 1' comprises a cam control carrier 25 designed as a cage, i.e., a control cage 26, by means of which the engaging element 21 is guided, in particular positively guided, along the predetermined movement path or the control profile 20 of the cam control. The control profile 20 is thereby formed inside the cage 26. Due to the use of the control cage 26, a biasing force $F_2$ is not required inasmuch as the engaging element 21 guided in the cage 26 cannot deviate from the predetermined movement path. The relations of forces in the rest position Y1 in this embodiment are shown as an example in FIG. 12.

In the embodiment shown in FIGS. 8 and 9, the first mechanical energy storage device 10 and the second mechanical energy storage device 11 are in turn formed by a spring element 12, in this case, by an L-shaped spring element. The spring element 12 is provided, as in the previously described embodiment, to introduce force upon actuation, wherein for example, it forms an integrally formed element 13 as the actuating element of the induction generator 1'. The force-introduction element 13 can also be formed separately from the spring element 12.

The spring element 12 in turn comprises a second section 18, which is attached or fixed to the longitudinal end of the induction coil 4 that is facing away from the magnet element 3. The opposite section or the first spring element 14, which is provided for connecting to the magnet element 3, corresponding to the first mechanical energy storage device 10, is in this case formed for articulation with a connecting element 16', which in turn is provided for an articulated connection to the magnet element 3. Such a connection allows transferring to the magnet element 3, with little friction, a force required for the movement in the displacement direction and in the return displacement direction, but no torque.

The end of the first section of the spring element 12 that is facing the magnet element 3 is formed for articulated connection to the connecting element 16', whereby it comprises, for example, two transversely projecting hinge elements 27, for example, in the form of projections, each of which engages, rotationally movable, with a corresponding coupling element 28 of a connecting element 16', for example, respectively with a first receiving opening. The connecting element 16' is formed, for example, by at least one arm 17', for example, two arms 17', which are firmly connected together by means of a connector. On the end of the connecting element 16' provided for connection to the magnet element 3, a further articulation element 29 is provided to realize a further hinge joint with a coupling element 30 of the magnet element 3. For this purpose, for example, a lower end of the arm 17' comprises a second receiving opening, by means of which in each case a corresponding coupling element 30 of the magnet element 3 is brought into engagement hinge-connected.

Upon actuation, the magnet element 3 of the induction generator 1' is brought, in the manner described above, into the intermediate position and after reaching the intermediate position by being mechanically accelerated by means of the energy stored in the first mechanical energy storage device 10 or the first section of the spring element 12, into the other rest position Y1, Y2. In this context, we wish to refer to the above embodiments of the induction generator 1, in particular to the functionality of the induction generator 1.

According to the invention, various induction generators 1, 1', i.e., different functionalities, can be formed in a simple way using different contour controls or different tax profiles 20. The induction generator 1, 1' can be generally designed bi-stable with two stable positions Y1, Y2, mono-stable with a rest position (i.e., self-resetting touch trigger), multi-stable with more than two rest positions or meta-stable (stable to small changes, but unstable to major changes).

FIG. 13 shows an example of a contour control, by means of whose control profile 20 a metastable radio switch 2 can be formed. Using both the first and the second described embodiment of an induction generator 1, 1', a meta-stable radio switch 2 can be formed. For this purpose, for example, the control profile 20 is adjusted such that in addition to the two stable rest positions Y1, Y2, a meta-stable position Y0 is provided during the movement path, i.e., a position, which can be taken up temporarily, as shown in FIG. 14. The further, meta-stable position Y0 is formed along the movement path between the first and second rest positions Y1, Y2.

In the course of a movement from one into the other rest position Y1, Y2, generally two electrical signals or pulses are generated. A first signal is generated upon interruption of the magnetic circuit, another signal is generated upon closing of the magnetic circuit, along with a polarity reversal of the coil core 5. The generated voltage or energy is dependent on the rate of change of the magnetic flow.

As a result of a different interruption speed due to the inertia law of the closing speed, upon opening of the magnetic circuit as a result of the detachment of the magnet element 3 from the limbs 6, 7, a quantity of energy is generated which is different from the energy generated as the result of contact with the limbs 6, 7, corresponding to a closing of the magnetic circuit. Upon opening, the amount of energy is quantitatively smaller than upon a closing of the magnetic circuit. By means of the meta-stable position Y0, there can be detected up to four signals, which are distinguishable by means of the polarity and the generated amount of energy.

The induction generator 1, 1' according to the invention is designed so that the switching point, corresponding to a movement initiation of the magnet element 3, is determined only by a certain amount of force, which is built up in the first energy storage device 10 or in the first section 14 of the spring element 12, corresponding, for example, to the two spring arms 15. The amount of force may fluctuate due to manufacturing tolerances of the parts, or by different magnetic forces or by the friction force distribution, thereby making possible a switching point inaccuracy.

In order to increase the switching point accuracy, the induction generator 1, 1' can be designed such that upon actuation on a defined path, and thus the switching point, the first energy storage device 10, for example, only 90% of the energy required for switching is stored. The last 10% of the force can be added by a direct actuation of the magnet element 3.

Structurally, this may be implemented, for example, so that for example from the force-introduction element 13, in particular an upper end, a rigid bar in the direction of the magnet element 3 is provided, which after defined path, corresponding to an elastic deformation of the spring element 12, presses directly on the magnet element 3 and, at a further activation, sets it in motion along the adjacent bevel 22.

The inventive induction generator 1, 1' can comprise an induction coil 4 that cooperates with the coil core 5, or two induction coils 4 (as shown, for example, in FIGS. 1, 8), into which a respective limb 6, 7 of the U-shaped coil core 5 is introduced such that the magnet element 3 can come into contact with the limbs ends. The according to the invention integrally formed first mechanical energy storage device 10 and the second mechanical energy storage device 11 in the form of spring element 12, in particular in the form of a spring clip, can be used to merge the magnet element 3 with the induction coil 4 into a one-piece module. For this purpose, the spring clip is fixed both to the magnet element 3 and the induction coil 4. The resulting module is composed exclusively of the spring clip, the induction coil 4 with the coil core 5 and the magnet element 3.

The inventive induction generator 1 can be used, for example, in a radio switch 1 having a transmitter assembly 31 and an antenna assembly 32 with an antenna. The induction generator 1 is electrically connected, for example by means of a plugging contact element 33, to the transmitter assembly 31 to transfer to it energy. The induction generator 1 can be actuated, for example, by means of an operation element 34 of the radio switch 2, which interacts with the force-introduction element 13, i.e., by introducing force into the control element 34 in the direction of displacement.

REFERENCE NUMERALS

1, 1' Induction generator
2 Radio switch
3 Magnet element
4 Induction coil
5 U-shaped coil core
6 First limb 7 Second limb
8 Permanent magnet
9 Pole pieces
10 First mechanical energy storage device
11 Second mechanical energy storage device
12 Spring element
12a First bracket end
12b Second bracket end
12c Force-introduction area
13 Force-introduction element
14 First spring element
14a End section
15 Spring arm
16, 16' Connection element
17, 17' Arm
18 Second spring element
18a End section
19 Support element
20 Control profile
21 Engaging element
22 First bevel
22a End
23 Second bevel
23a End
24 Stopper element
25 Cam control carrier
26 Control cage
27, 28, 29, 30 Hinge elements
31 Transmitter module
32 Antenna assembly
33 Contact element
34 Operation element
X Direction of displacement
Y Direction of reverse displacement

The invention claimed is:

1. An induction generator for a radio switch comprising:
a magnet element; and
an induction coil with a coil core,
wherein the coil core is U-shaped,
wherein a first rest position and a second rest position are in each case defined for the magnet element in contact with the limbs of the coil core, and a flux direction reversal takes place in the coil core whenever a change takes place between the first and second rest positions,
wherein a movement path for the magnet element is pre-determined for a movement between the first and second rest positions, and the movement path for the magnet element is pre-determined by a cam control, which is formed by a control profile and an engaging element that is guided along the control profile,
wherein the induction generator has a first energy storage device which is operatively connected to the magnet element and stores energy in the course of forcing a movement from a rest position and, after reaching an intermediate position, which is defined along the movement path and corresponding to which the magnetic forces on the coil core suddenly decrease, emits energy from the first energy storage device to the magnet element in order to mechanically accelerate the movement of the magnet element to the respective other rest position after leaving the intermediate position.

2. The induction generator according to claim 1, wherein, for reversing the polarity of the coil core in one direction relative to the limbs, the magnet element is displaceably arranged on the induction coil, in which the limbs are adjacent to each other.

3. The induction generator according to claim 1 wherein the movement path between the first and second rest positions is predetermined such that during a forced movement after leaving the intermediate position until taking up the respective other rest position, the magnet element reaches the core coil without contact.

4. The induction generator according to claim 1 wherein the movement path is predetermined such that when leaving the first or second rest positions, a displacement and then a turn-in occurs at the movement from the first rest position into the second rest position and vice versa.

5. The induction generator according to claim 1 wherein, the control profile of the cam control comprises two bevels extending towards each other, between which a plateau is formed that guides the engaging element and facilitates a displacement of the engaging element away from one of the first or second rest positions and a turn-in of the engaging element towards the other of the first or second rest positions.

6. The induction generator according to claim 1 wherein a biasing force presses the engaging element against the control profile.

7. The induction generator according to claim 1,
wherein the control profile is retained in a control cam carrier formed as a control cage, and
wherein the control profile is formed as a profile groove.

8. The induction generator according to claim 7
wherein the magnet element comprises the engaging element,
wherein the induction coil comprises the control cam carrier, which forms the control profile of the cam control, and
wherein, during a forced movement, the engaging element is guided along the control profile between the first and second rest positions.

9. The induction generator according to claim 1 wherein, for defining the first and second rest positions, the control profile in each case comprises a stop element, which together with a bevel of the control profile forms a latching seat for the engaging element.

10. The induction generator according to claim 1 wherein the induction generator comprises a second mechanical energy storage device, which in correspondence with the movement of the magnet element from the first rest position to the second rest position stores continuously increasing actuation energy, which can be released in order to secure a movement of the magnet element in the reverse direction.

11. The induction generator according to claim 1 wherein, for actuation, the induction generator comprises a spring element formed as an actuation element, which forms the first energy storage device for the storage of actuation energy in the course of forcing a movement, and wherein the actuation element is an L-shaped or bow-shaped actuation element.

12. The induction generator according to claim 1 further comprising a second mechanical energy storage device formed integrally with the first mechanical energy storage device,
wherein a spring element forms the first mechanical energy storage device, which is designed for storing actuating energy that can be released for a mechanical acceleration of the movement of the magnet element from either of the first or second rest positions to the other of the first or second rest positions, and
wherein the second mechanical energy storage device is designed for storing actuating energy to generate a restoring force.

13. The induction generator according to claim 1 wherein the first mechanical energy storage device is formed by a spring element or a section of the spring element, which is rigidly connected to the magnet element by a connection element such that a torque and a force can be transferred by an arm,
wherein, by the connection element, a biasing force acts on the magnet element.

14. The induction generator according to claim 1 wherein the first mechanical energy storage device is designed in the form of a spring element or a section of the spring element, to which is hinged a connecting element that is joint-connected with the magnet element such that a force can be transferred onto the magnet element.

15. The induction generator according to claim 1 further comprising a second energy storage device,
wherein the first energy storage device, which is formed as at least one spring arm, extends from a force-introduction area of a spring element in the direction of the magnet element,
wherein the second energy storage device, which is formed as a leaf-shaped spring element, extends from the force-introduction area of the spring element in the direction of a longitudinal end of the induction coil that is facing away from the magnet element.

16. The induction generator according to claim 1 further comprising a spring element and a second energy device,
wherein the spring element is supported on the induction coil by the second energy storage device, and is connected to the magnet element the first energy storage device for transmitting power.

17. The induction generator according to claim 1,
wherein a force from energy stored in the first energy storage device can be exerted on the magnet element by a spring element or a first section of the spring element, and
wherein the force acts in a direction, in which the limbs are adjacent to each other.

18. The induction generator according to claim 1 wherein the control profile defines a position for the magnet element between the first rest position and the second rest position, which is formed as a meta-stable position.

19. A radio switch comprising:
a transmitter module; and
an antenna,
wherein the radio switch comprises an induction generator according to claim 1.

* * * * *